(12) United States Patent
Uozu et al.

(10) Patent No.: US 8,960,345 B2
(45) Date of Patent: Feb. 24, 2015

(54) TRANSPORTER VEHICLE

(71) Applicant: Hitachi Construction Machinery Co., Ltd., Tokyo (JP)

(72) Inventors: Hironori Uozu, Kasumigaura (JP); Shinji Akino, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/362,770

(22) PCT Filed: Jan. 31, 2013

(86) PCT No.: PCT/JP2013/052169
§ 371 (c)(1),
(2) Date: Jun. 4, 2014

(87) PCT Pub. No.: WO2013/118630
PCT Pub. Date: Aug. 15, 2013

(65) Prior Publication Data
US 2014/0332295 A1    Nov. 13, 2014

(30) Foreign Application Priority Data

Feb. 6, 2012 (JP) ................................. 2012-022986

(51) Int. Cl.
*B60K 11/00* (2006.01)
*B01D 45/12* (2006.01)
*B60K 11/06* (2006.01)

(52) U.S. Cl.
CPC ................ *B01D 45/12* (2013.01); *B60K 11/06* (2013.01); *Y10S 903/904* (2013.01)
USPC .......................................... 180/68.1; 903/904

(58) Field of Classification Search
CPC ....... B01D 45/04; B01D 45/12; B01D 50/002
USPC .............. 180/68.1, 68.2, 68.3, 65.21, 65.265, 180/69.6; 55/347; 123/563
See application file for complete search history.

(56) References Cited

U.S. PATENT DOCUMENTS 2,004,468 A * 6/1935 Hawley ........................... 55/347
4,014,673 A * 3/1977 Kinnison ......................... 55/396
4,218,223 A * 8/1980 Lidstone et al. ................ 95/271

(Continued)

FOREIGN PATENT DOCUMENTS

| JP | 01-231635 A | 9/1989 |
| JP | 04-29426 U | 3/1992 |

(Continued)

*Primary Examiner* — J. Allen Shriver
*Assistant Examiner* — Brodie Follman
(74) *Attorney, Agent, or Firm* — Mattingly & Malur, PC

(57) ABSTRACT

A cooling air supply device (22) for supplying cooling air to an alternator (19) and an electric motor (20) for traveling is provided with a cooling air inlet port (24B) for taking in outside air as cooling air; a cooling air supply line (23) for establishing connection between the cooling air inlet port (24B), and the alternator (19) and the electric motor (20), and an alternator side cooling fan (36) and an electric motor side cooling fan (37) for sucking cooling air from the cooling air inlet port (24B) into the cooling air supply line (23). A dust separator (28) is provided in the halfway section of the cooling air supply line (23) to spirally circulate the cooling air and centrifugally separate the dust from the cooling air, and the dust in the cooling air is separated by the dust separator (28).

6 Claims, 10 Drawing Sheets

(56) References Cited

U.S. PATENT DOCUMENTS

| | | | |
|---|---|---|---|
| 4,242,115 A * | 12/1980 | Harold et al. | 55/347 |
| 4,793,832 A * | 12/1988 | Veltman et al. | 95/14 |
| 5,320,654 A * | 6/1994 | Minami | 55/347 |
| 6,878,178 B2 * | 4/2005 | Schulze et al. | 55/385.3 |
| 2006/0272621 A1 * | 12/2006 | Acuna et al. | 123/542 |
| 2008/0098998 A1 * | 5/2008 | Dicke | 123/563 |
| 2011/0120426 A1 * | 5/2011 | Back et al. | 123/542 |
| 2013/0199862 A1 * | 8/2013 | Ogawara et al. | 180/68.1 |

FOREIGN PATENT DOCUMENTS

| | | |
|---|---|---|
| JP | 2000-126710 A | 5/2000 |
| JP | 2002-089380 A | 3/2002 |

* cited by examiner

TRANSPORTER VEHICLE

TECHNICAL FIELD

The present invention relates to a transporter vehicle such as a dump truck that transports minerals and the like excavated from a mine, for example.

BACKGROUND ART

In general, in an excavating site or a mine for open-pit mining, a hydraulic excavator is used to perform a work in such a manner that a large amount of minerals, and earth and sand are excavated, and a large amount of the excavated minerals (crushed stones) are loaded on a large-sized transporter vehicle called a dump truck to be transported to an unloading area such as a port.

This dump truck is configured schematically of a vehicle body on which a loading platform (vessel) for loading objects to be transported is provided, an engine that is mounted on the vehicle body, an alternator that is driven by the engine to perform power generation, and an electric motor for traveling to which drive power is supplied based upon the power generation of the alternator.

Since the alternator and the electric motor generate heat at the time of driving the dump truck, the dump truck is provided with a cooling air supply device for supplying cooling air to the alternator and the electric motor. This cooling air supply device is configured schematically of a cooling air inlet port for taking in outside air as cooling air, a cooling air supply line for establishing connection between the cooling air inlet port, and the alternator and electric motor as cooling targets, and a cooling fan (blower) for sucking cooling air into the cooling air supply line from the cooling air inlet port (See, Patent Document 1).

PRIOR ART DOCUMENT

Patent Document

Patent Document 1: Japanese Patent Laid-Open No. Hei 1-231635 A

SUMMARY OF THE INVENTION

Incidentally, in a working side such as an excavating pit on which dump trucks travel, dust such as fine sand or powder dust is mixed into outside air. Therefore, when the outside air is supplied to the alternator or the electric motor as cooling air as it is, the dust in the outside air collides with the alternator or the electric motor. As a result, there occurs a problem of degrading durability of coils, electrical wires and the like of the alternator and the electric motor, for example.

For overcoming this problem, for example, it is conceived that a filter is provided in the cooling air inlet port and the dust is removed from the cooling air by using the filter. In this case, however, there is a possibility that the filter is clogged with the dust with an elapse of an operating time to reduce the cooling air amount.

In view of the aforementioned problems in the conventional art, it is an object of the present invention to provide a transporter vehicle that can remove dust from cooling air that cools an alternator and an electric motor for traveling, and can keep a sufficient cooling air amount.

(1) A transporter vehicle according to the present invention comprises a vehicle body on which a loading platform for loading objects to be transported is provided; an engine that is mounted on the vehicle body; an alternator that is driven by the engine to perform power generation; an electric motor for traveling to which drive power is supplied based upon the power generation of the alternator; and a cooling air supply device for supplying cooling air to the alternator and the electric motor that are cooling targets, wherein the cooling air supply device is comprising: a cooling air inlet port for taking in outside air as cooling air; a cooling air supply line for establishing connection between the cooling air inlet port and the cooling targets; and a cooling fan for sucking the cooling air from the cooling air inlet port into the cooling air supply line.

In order to solve the above-described problems, the configuration that the invention as defined in claim 1 is characterized in that a dust separator is provided in the halfway section of the cooling air supply line to be positioned upstream of the cooling fan and spirally circulate the cooling air, thereby, centrifugally separating the dust from the cooling air; and the cooling air purified by the dust separator is supplied to the alternator and the electric motor by the cooling fan.

With this arrangement, since the dust separator is provided in the halfway section of the cooling air supply line for centrifugally separating the dust from the cooling air, both removing the dust from the cooling air and keeping the cooling air amount can be performed. That is, since the dust separator can remove the dust from the cooling air, the durability of each of the alternator and the electric motor that are the cooling targets can be ensured. Moreover, since it is not necessary to use the filter having the possibility of being clogged, there is no possibility that the cooling air amount is reduced with an elapse of an operating time. Therefore, it is possible to stably cool the alternator and the electric motor over a long period of time. As a result, durability and stability of the transporter vehicle can be improved.

(2) According to the present invention, the cooling air supply line is provided with a assembly box including an inlet port into which the cooling air flows, a dust separator side joint port to which the dust separator is jointed, an alternator side joint port communicated with the alternator, and an electric motor side joint port communicated with the electric motor, the dust separator includes a separator inlet port into which cooling air containing dust flows and a separator outlet port from which the cooling air from which the dust is separated flows out, the separator inlet port is jointed to the dust separator side joint port of the assembly box, and the separator outlet port is communicated with the alternator side joint port and the electric motor side joint port of the assembly box.

With this arrangement, the cooling air containing the dust is introduced through the separator inlet port jointed to the dust separator side joint port of the assembly box into the dust separator, which separates the dust from the cooling air. On the other hand, the cooling air from which the dust is separated flows out from the separator outlet port of the dust separator to the alternator side joint port and the electric motor side joint port of the assembly box to be supplied to the alternator and the electric motor. As a result, only the cooling air purified by the separation of the dust can be supplied to the alternator and the electric motor.

(3) According to the present invention, the assembly box is provided therein with a joint box for jointing the separator outlet port of the dust separator to the alternator side joint port and the electric motor side joint port, and a partition member for blocking off the cooling air flowing in from the inlet port to directly flowing into the alternator side joint port and the electric motor side joint port not through the joint box.

With this arrangement, when the cooling air containing the dust flows into the assembly box, the partition member can prevent the cooling air from directly flowing into the alternator side joint port and the electric motor side joint port not through the joint box. Accordingly, the cooling air having flown into the assembly box is certainly introduced into the dust separator by the joint box, thereby making it possible to purify the cooling air. On the other hand, the purified cooling air having flown out from the separator outlet port of the dust separator is introduced to the alternator side joint port and the electric motor side joint port by the joint box. Thereby, a large amount of the purified cooling air can efficiently be supplied to the alternator and the electric motor.

(4) According to the present invention, a control cabinet in which a control board for controlling electrical equipment is accommodated is jointed to the inlet port of the assembly box, and the control cabinet is provided with the cooling air inlet port. With this arrangement, it is possible to cause the cooling air taken in from the cooling air inlet port of the control cabinet to flow into the assembly box through the inlet port of the assembly box.

(5) According to the present invention, the inlet port of the assembly box is used as the cooling air inlet port. With this arrangement, it is possible to directly take the cooling air into the assembly box through the inlet port of the assembly box.

(6) According to the present invention, the cooling air supply line comprises: a control cabinet to which the cooling air inlet port opens and a cooling air outlet port opens; the assembly box including an inlet port connected to the cooling air output port of the control cabinet, a dust separator side joint port to which the dust separator is jointed, an alternator side joint port communicated with the alternator, and an electric motor side joint port communicated with the electric motor; an alternator side duct for jointing the alternator side joint port of the assembly box and the alternator; and an electric motor side duct for jointing the electric motor side joint port of the assembly box and the electric motor; wherein the dust separator side joint port of the assembly box is positioned upstream of the alternator side joint port and the electric motor side joint port in a flowing direction of cooling air.

With this arrangement, the assembly box and the dust separator can be arranged together to be adjacent to the control cabinet. In this case, the dust separator can be jointed to the existing assembly box without necessity of a large design change. In addition, the dust separator side joint port is positioned upstream of the alternator side joint port and the electric motor side joint port in the flowing direction of the cooling air. Accordingly, the dust in the cooling air to be supplied to the alternator and the electric motor can be removed by one dust separator. Thereby, as compared to a case where the dust separator is mounted to each of the alternator-side dust and the electric motor-side dust, the dust separator can be provided without the necessity of the large design change.

(7) According to the present invention, the dust separator comprises: a cylindrical outer tube that is arranged to extend in an upper-lower direction and into which cooling air flows from the cooling air inlet port; an inner tube that is positioned inside the outer tube and is arranged to extend in the upper-lower direction, and from which the purified cooling air flows out; a spiral passage body that is arranged between the outer tube and the inner tube and separates the dust while the cooling air spirally circulates therein; and a dust receiver that is removably mounted to the outer tube in a lower end of the outer tube to reserve the dust separated from the cooling air by the spiral passage body.

With this arrangement, the passing of the cooling air through the spiral passage body arranged between the outer tube and the inner tube enables the dust from being separated (removed) from the cooling air. The cooling air from which the dust is separated is sent through the inside of the inner tube to the alternator and the electric motor, and the dust separated from the cooling air is reserved in the dust receiver removably mounted in the lower end side of the outer tube. Even when the dust reserved in the dust receiver increases with an elapse of an operating time or the like, the dust can be disposed by removing the dust receiver from the outer tube as needed. Therefore, jobs such as preparation and replacement of a new filter as in the case of using the filter are not necessary, and it is possible to easily perform maintenance of the dust separator including disposal of the dust.

MODE FOR CARRYING OUT THE INVENTION

Figure 1:
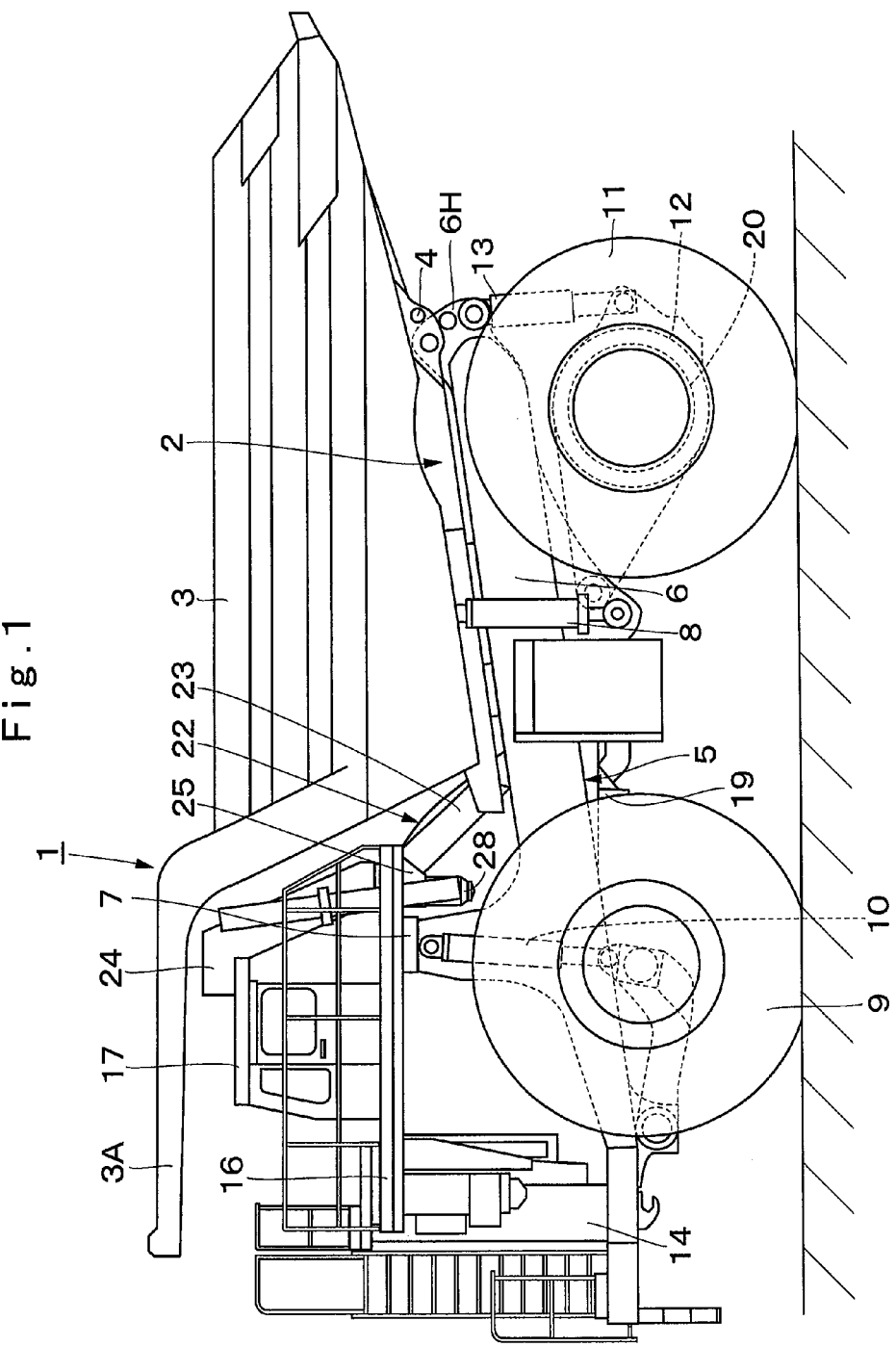
FIG. 1 is a front view showing a dump truck according to an embodiment in the present invention.
Figure 2:
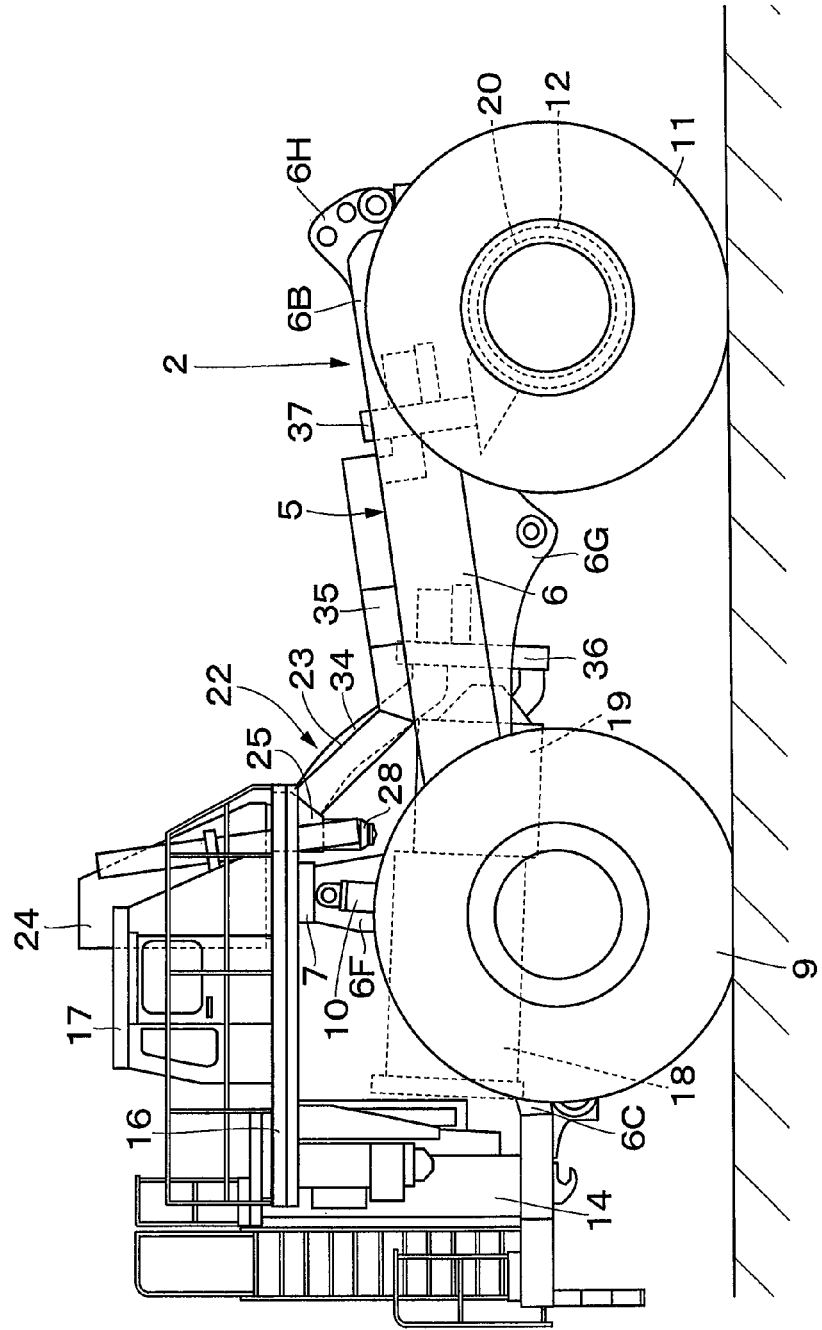
FIG. 2 is a front view showing the dump truck in a state where a loading platform is removed from the dump truck.

Hereinafter, a transporter vehicle according to an embodiment of the present invention will be in detail explained with reference to the accompanying drawings, by taking a dump truck for transporting crushed stones (minerals) excavated in a mine or the like as an example.

In the figure, designated at 1 is a dump truck which is a large-sized transporter vehicle. The dump truck 1 schematically comprises a vehicle body 2 formed of a rigid frame structure and a loading platform (vessel) 3 tiltably (liftably) mounted on the vehicle body 2. The vehicle body 2 comprises a frame 5, a housing 14, a deck 16 and a cab 17, which will be described later.

The loading platform 3 is formed as a large-sized container whose overall length reaches as much as 10 to 14 meters to load thereon a large volume of heavy objects to be transported, such as crushed stones. A rear side bottom portion of the loading platform 3 is tiltably coupled to a rear end side (bracket portion 6H to be described later) of the vehicle body 2 by using a connecting pin 4 and the like. In addition, a protector 3A horizontally extending from the top portion to the front side is integrally provided on a front side of the loading platform 3, and this protector 3A extends to a point close to a front end position of the deck 16 in such a manner as to cover the cab 17 to be described later from an upper side thereof.

That is, a bottom portion side of the loading platform 3 is rotatably supported to a rear portion side of the vehicle body 2 by using the connecting pin 4. A front portion side (side of the protector 3A) of the loading platform 3 is rotated (moves up and down) in an upper-lower direction using the connecting pin 4 as a fulcrum by extending or contracting a hoist cylinder 8 to be described later.

A frame 5 is provided as a base of the vehicle body 2, and the frame 5 is formed as a rigid support structure body having a plate working structure. The frame 5 schematically comprises a base frame 6 extending in a front-rear direction and an upper lateral beam 7 arranged in the intermediate part of the base frame 6 in the front-rear direction.

Figure 4:
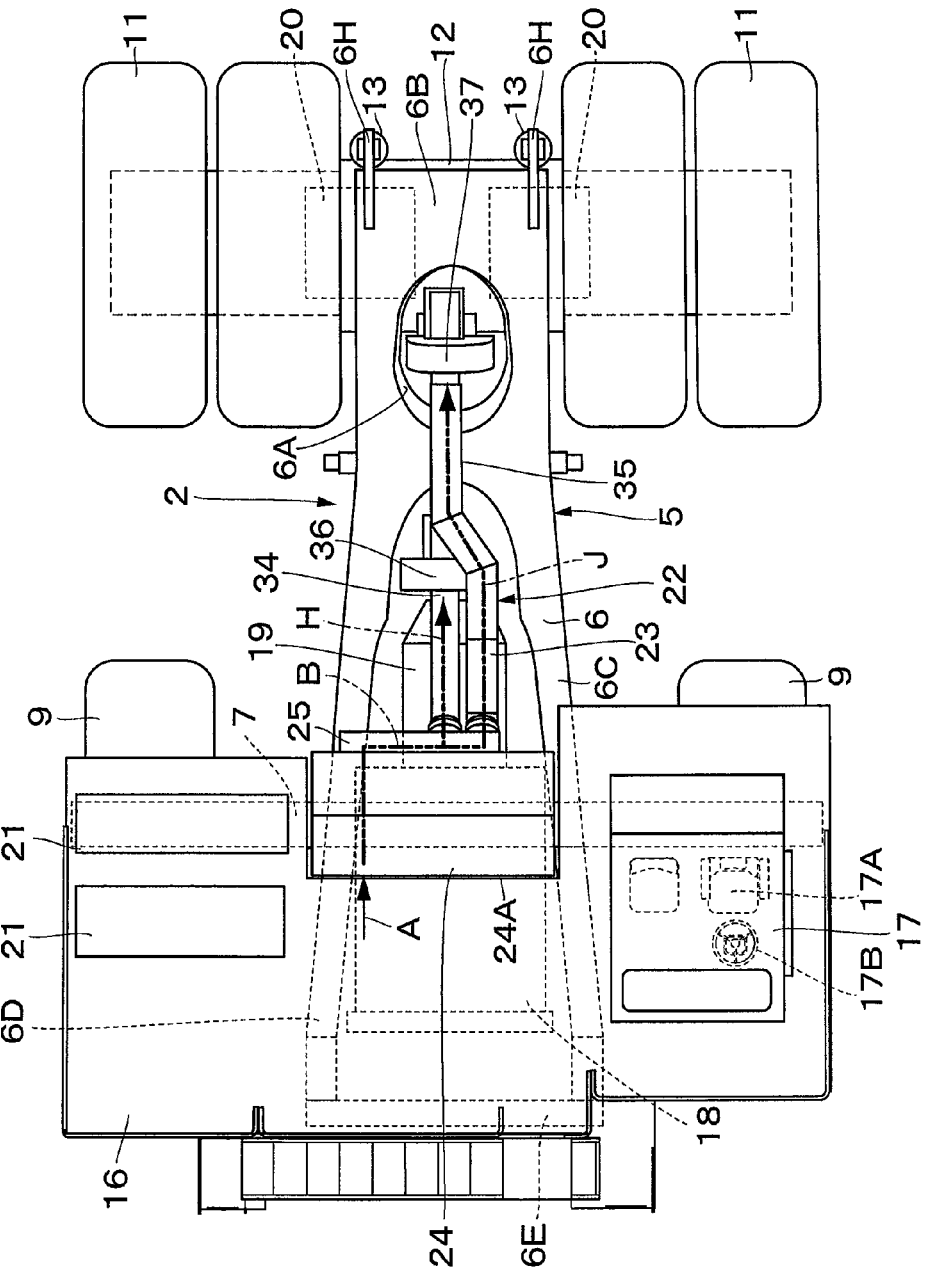
FIG. 4 is a plan view as viewed from above in a state where the loading platform is removed from the dump truck.
Figure 5:
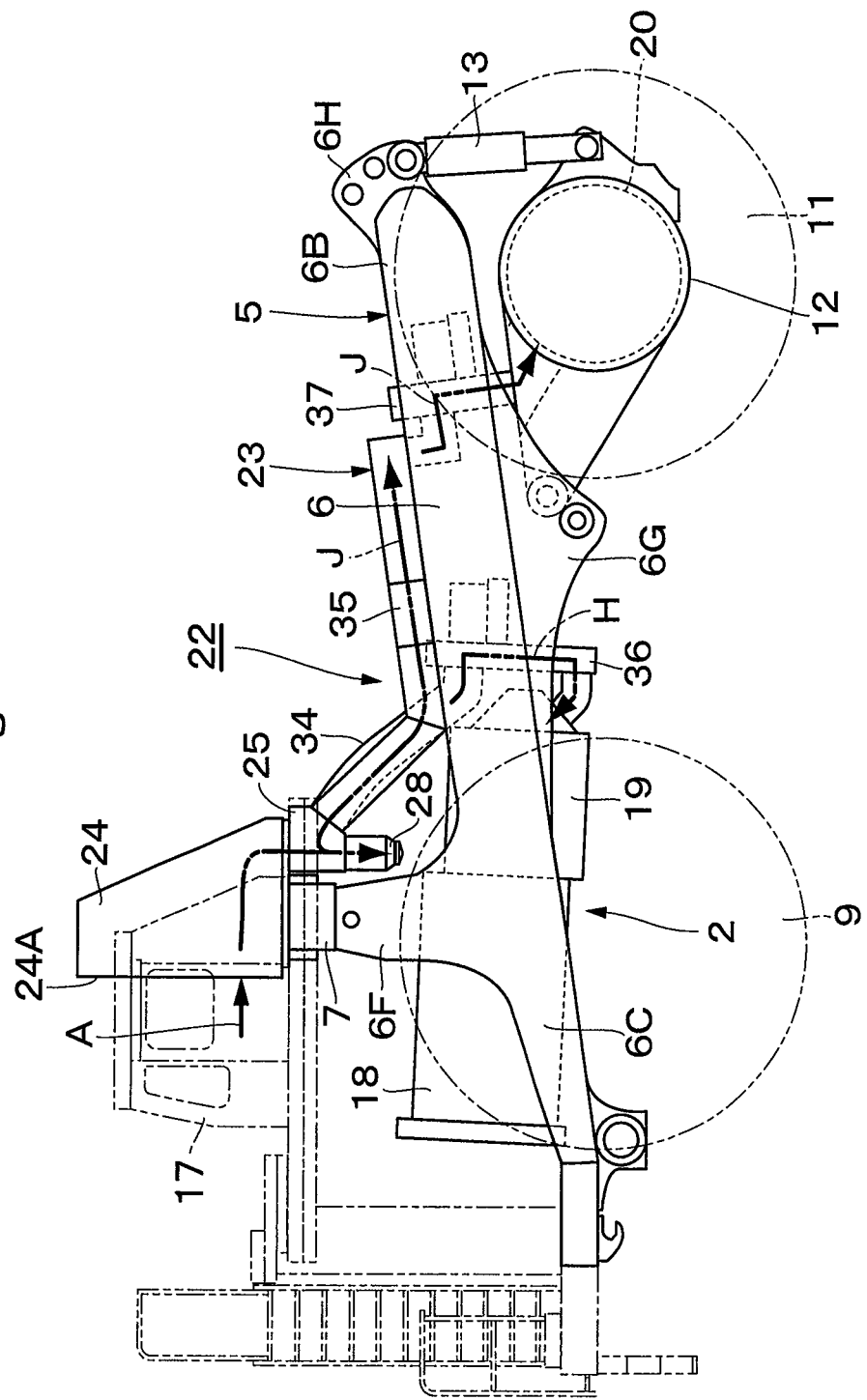
FIG. 5 is a front view showing a frame, an engine, an alternator, an electric motor, a cooling air supply device and the like as viewed in the same direction as in FIG. 2.

As shown in FIG. 4 and FIG. 5, the base frame 6 includes a rear frame part 6B that is formed in a substantially rectangular shape and in the center of which an oval opening portion 6A is provided, and a left leg part 6C and a right leg part 6D extending from a front end side of the rear frame part 6B to the forward side to be openly enlarged in a V-letter shape or U-letter shape. The respective front ends of the leg parts 6C and 6D are connected in the left-right direction by a front connecting beam portion 6E. Left and right column portions 6F (only the left one is shown) are provided to project upward in the halfway positions of the respective leg parts 6C and 6D in the longitudinal direction (front-rear direction). Left and right cylinder mounting portions 6G (only the left one is shown) projecting downward in a mountain shape are provided in a front portion side of the rear frame part 6B, and left and right bracket portions 6H are provided to project in a rear end portion of the rear frame part 6B.

The engine 18 to be described later is arranged between the left and right leg parts 6C and 6D, and the housing 14 to be described later is mounted on the left and right leg parts 6C and 6D. On the other hand, the upper lateral beam 7 to be described later is disposed on an upper end side of the left and right column portions 6F, and the hoist cylinders 8 to be described later are mounted on the left and right cylinder mounting portions 6G. The loading platform 3 is mounted on the left and right bracket portions 6H through the connecting pin 4, and an axle housing 12 to be described later is mounted on the left and right bracket portions 6H through a rear wheel side suspension 13.

The upper lateral beam 7 forms the frame 5 together with the base frame 6. The upper lateral beam 7 is formed in a hollow, prismatic shape to extend in the left-right direction, and is mounted on upper end portions of the left and right column portions 6F forming part of the base frame 6. In addition, as shown in FIG. 4 and FIG. 5, the upper lateral beam 7 extends in the left-right direction from the respective column portions 6F of the base frame 6, and supports the deck 16, the cab 17, the control cabinet 24, which will be described later, and the like from downside.

The left and right hoist cylinders 8 (only the left one is shown in FIG. 1) can tilt the loading platform 3 to the vehicle body 2 in the upper-lower direction. For example, each hoist cylinder 8 comprises a multiple type of hydraulic cylinder and is telescopically provided between the base frame 6 and the loading platform 3. A lower end side (rod side) of each hoist cylinder 8 is rotatably mounted on the cylinder mounting portion 6G of the base frame 6, and an upper end side (tube side) of each hoist cylinder 8 is rotatably mounted on a lower surface side of the loading platform 3. Therefore, the front side of the loading platform 3 rotates (moves up and down) in the upper-lower direction on a basis of the connecting pin 4 as fulcrum by extending or contracting the hoist cylinder 8. Thereby, the front portion side of the loading platform 3 can be lifted upward to discharge crushed stones loaded on the loading platform 3.

The left and right front wheels 9 are rotatably mounted on the front side of the vehicle body 2, and each front wheel 9 forms part of a steering wheel steered (operated to be steered) by an operator of the dump truck 1. Each of the left and right front wheels 9 is, as similar to rear wheels 11 to be described later, formed having a tire diameter (outer diameter dimension) as much as 2 to 4 meters, for example.

Left and right front-wheel side suspensions 10 (only the left one is shown) support the front wheels 9 to the vehicle body 2. Each front-wheel side suspension 10 comprises, for example, a hydraulic shock absorber, and is telescopically mounted between the column portion 6F of the base frame 6 and the front wheel 9. The front-wheel side suspension 10 shock-absorbs transmission of vibration to the front side of the vehicle body 2 even when the front wheel 9 vibrates caused by concave and convex portions of road surfaces.

The left and right rear wheels 11 are rotatably mounted on the rear side of the vehicle body 2, and each rear wheel 11 forms part of a driving wheel of the dump truck 1 and is rotatably supported to the axle housing 12 to be described later. Each rear wheel 11 is driven and rotated by an electric motor 20, which will be described later, accommodated in the axle housing 12.

Indicated at 12 is the axle housing that is provided in a rear-portion lower side of the vehicle body 2, and the axle housing 12 is formed as a cylindrical body extending in an axial direction (left and right direction of the vehicle body 2) between the left and right rear wheels 11. The axle housing 12 is mounted on the rear-portion lower side of the vehicle body 2 through the rear wheel side suspension 13 to be described later.

A pair of electric motors 20 to be described later are provided in the axle housing 12 to drive and rotate the left and right rear wheels 11 individually. Rotation of an output shaft of each electric motor 20 is made low in speed and large in torque through a gear reduction mechanism (not shown), which will be transmitted to each rear wheel 11. An electric motor side duct 35 of the cooling air supply device 22 to be described later is connected to an axial intermediate part of the axle housing 12, and each electric motor 20 is cooled by cooling air supplied through the electric motor side duct 35.

The left and right rear-wheel side suspensions 13 support the axle housing 12 to the vehicle body 2. Each rear wheel side suspension 13 comprises, for example, a hydraulic shock absorber, and is telescopically mounted between the bracket portion 6H of the base frame 6 and the axle housing 12. The rear wheel side suspension 13 shock-absorbs transmission of vibration of a rear wheel 11 side to the rear side of the vehicle body 2 through the axle housing 12.

The housing 14 forms a part of the vehicle body 2, and the housing 14 is positioned in front of the column portion 6F and is mounted on the left and right leg parts 6C and 6D. The housing 14 accommodates therein a heat exchanger 15 (refer to FIG. 3) such as a radiator positioned in front of the engine 18 to be described later. In addition, the housing 14 supports the deck 16 from a lower side in cooperation with the upper lateral beam 7.

The deck 16 is positioned under the protector 3A of the loading platform 3 and is provided on an upper side of the housing 14, and the deck 16 is arranged in a position above the front wheel 9. The deck 16 forms a flat passage surface on the front upper side (housing 14) of the vehicle body 2, and the cab 17 and a grid box 21 which will be described later, and the like are disposed on the deck 16.

The cab 17 is positioned in front of the loading platform 3, and is provided in a left, upper end portion of the vehicle body 2. The cab 17 is arranged on the deck 16, and is supported by the upper lateral beam 7 of the frame 5 and the housing 14 from a lower side. The cab 17 defines therein an operator's room in which an operator gets, and an operator's seat 17A, a steering handle 17B, further, a start switch, an accelerator pedal, a brake pedal, an operating lever (any of them is not shown) and the like are disposed in the cab 17.

Indicated at 18 is the engine that is positioned under the upper lateral beam 7 of the frame 5 and is mounted on the vehicle body 2. The engine 18 is configured by, for example, a large-sized diesel engine and drives the alternator 19 to be described later. Further, the engine 18 drives and rotates a hydraulic pump (not shown) as a hydraulic source, and the hydraulic pump supplies pressurized oil to the hoist cylinder 8, a steering cylinder (not shown) for power steering, and the like.

Figure 6:
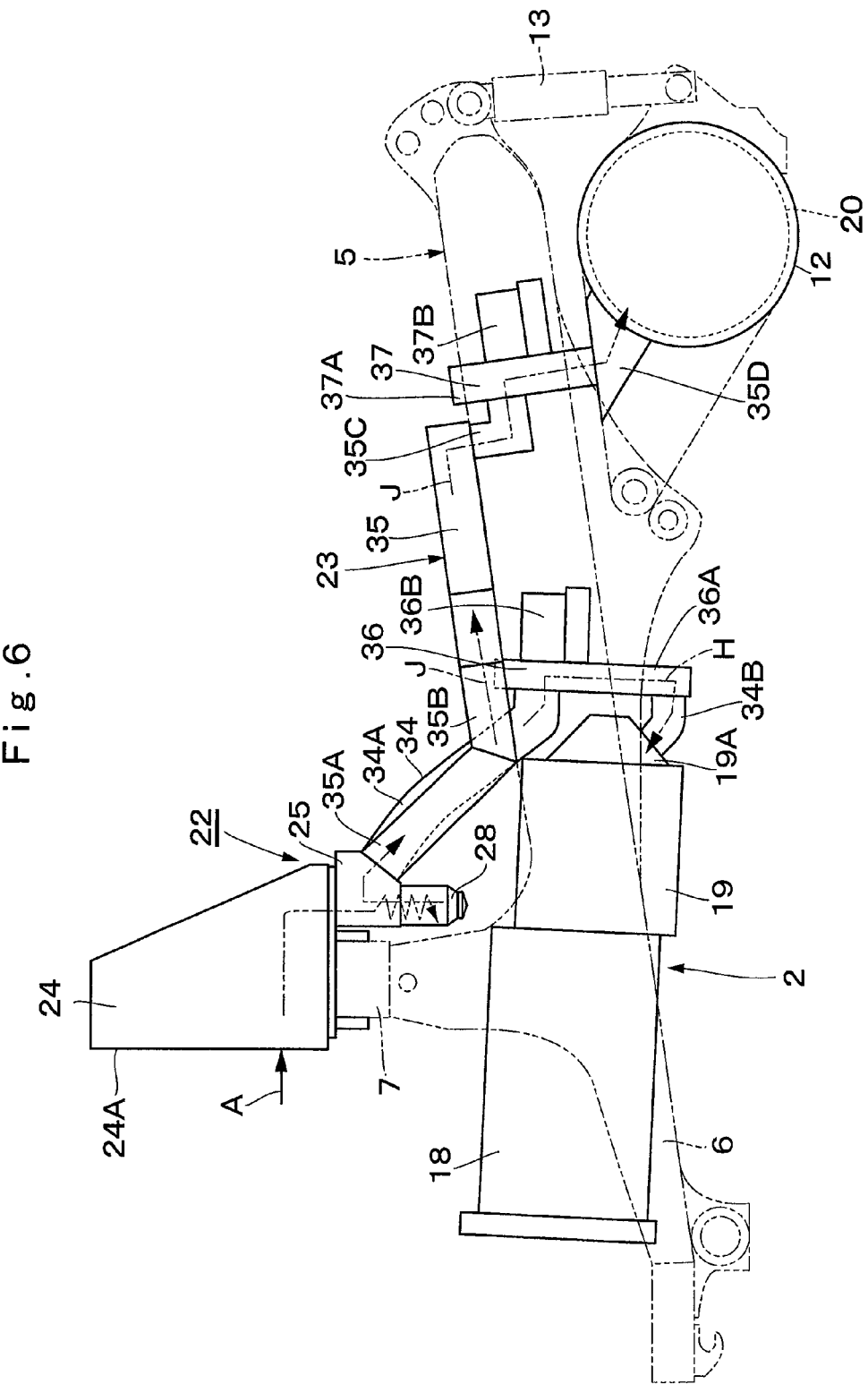
FIG. 6 is an enlarged front view showing the cooling air supply device as viewed in the same direction as in FIG. 5.

Indicated at 19 is the alternator that is driven by the engine 18. The alternator 19 performs power generation of drive power that is output to the electric motor 20 to be described later, and generates three-phase alternating power in the order of 1500 kW, for example. As shown in FIG. 6, an alternator side duct 34 of the cooling air supply device 22 to be described later is connected to a casing 19A of the alternator 19, and the alternator 19 is cooled by cooling air supplied through the alternator side duct 34.

Indicated at 20 are the pair of the electric motors for traveling that are provided in the axle housing 12. Each electric motor 20 is configured by a large-sized electric motor comprising, for example, a three-phase induction electric motor or a three-phase brushless direct current electric motor and the like, and drives and rotates the left and right rear wheels 11 independently to each other. Herein, drive power based upon power generation of the alternator 19 is supplied to each electric motor 20, and a rotary shaft of each electric motor 20 rotates by supply of the drive power. The rotation of the rotary shaft of each electric motor 20 is transmitted through the gear reduction mechanism (not shown) and the like to each rear wheel 11, and the dump truck 1 travels with rotation of each rear wheel 11.

The grid box 21 is disposed at the opposite side (in the right and upper end side of the vehicle body 2) to the cab 17 around the control cabinet 24 to be described later. The grid box 21 is arranged on the deck 16, and is supported from a lower side by the upper lateral beam 7 of the frame 5 and the housing 14. An apparatus comprising a resistor for consuming direct current power at deceleration of a vehicle and a blower for cooling the resistor is accommodated in the grid box 21.

Next, an explanation will be made of the cooling air supply advice 22 for cooling the alternator 19 generating heat at the driving of the dump truck 1 and the electric motor 20 for traveling.

Designated at 22 is the cooling air supply device for supplying cooling air to the alternator 19 and the electric motor 20 for traveling as cooling targets. The cooling air supply device 22 supplies outside air taken in from the cooling air inlet port 24B of the control cabinet 24 to the alternator 19 and the electric motor 20 as cooling air, thereby to cool the alternator 19 and the electric motor 20. Herein, the cooling air supply device 22 is configured schematically by the cooling air inlet port 24B provided in the control cabinet 24 to take in outside air as cooling air, a cooling air supply line 23, an alternator side cooling fan 36, and an electric motor side cooling fan 37, which will be described later.

Indicated at 23 is the cooling air supply line that establishes connection between the cooling air inlet port 24B, and the alternator 19 and the electric motor 20 for traveling. The cooling air supply line 23 includes the control cabinet 24, the assembly box 25, the alternator side duct 34, and the electric motor side duct 35, which will be described later.

Indicated at 24 is the control cabinet that is provided in a center of an upper end portion of the vehicle body 2 to line up to the right of the cab 17, and the control cabinet 24 is supported from a lower side by the upper lateral beam 7 of the frame 5. A control board for controlling electrical equipment is accommodated primarily in the control cabinet 24. Specifically, an inverter for controlling the electric motor 20 for travelling, the control board for controlling electric current generated by the alternator 19 and a rotational speed of the engine 18, a radiator for cooling water for the inverter and the like are accommodated in the control cabinet 24.

Figure 3:
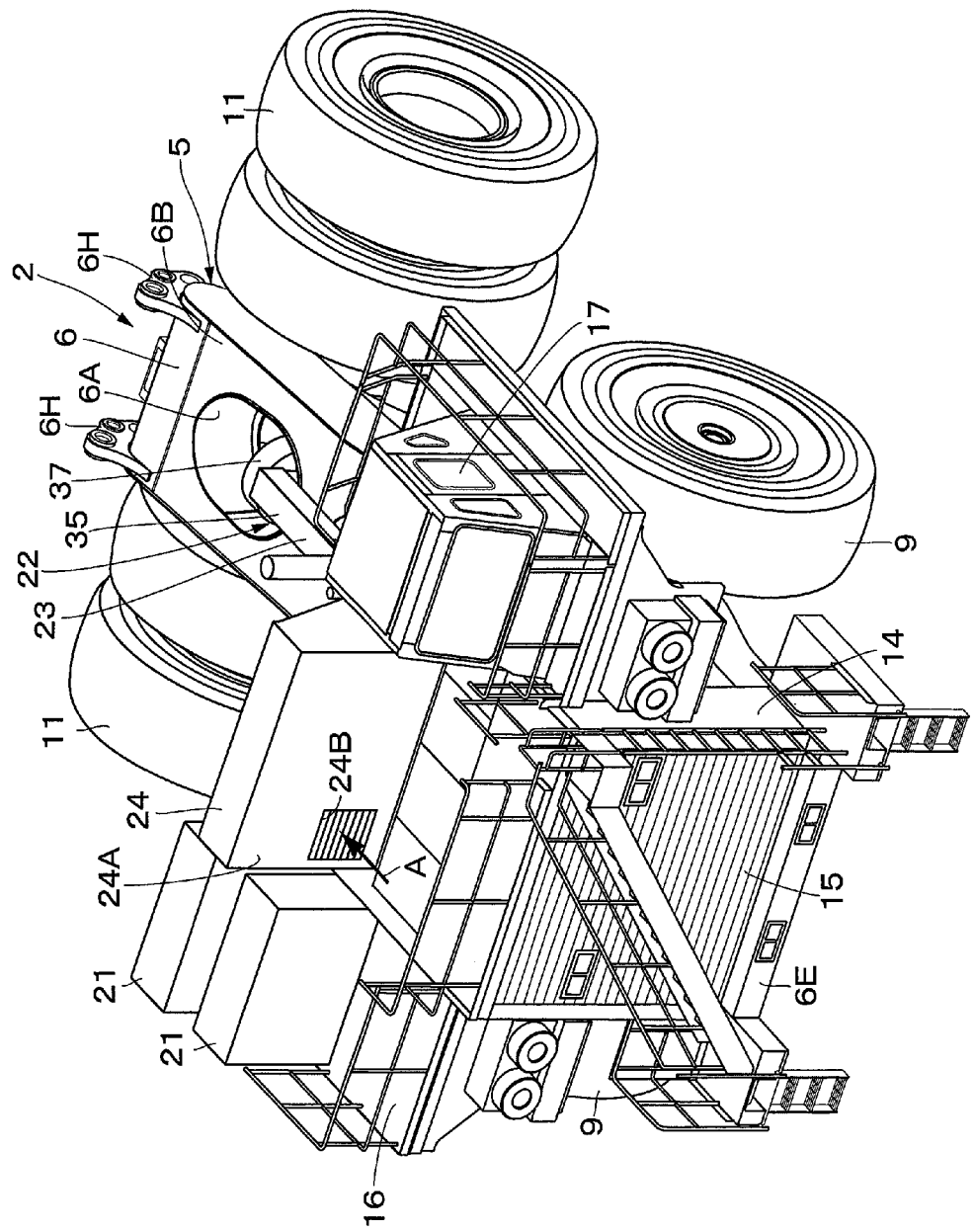
FIG. 3 is a perspective view showing the dump truck as viewed from a left oblique front side in a state where the loading platform is removed from the dump truck.
Figure 7:
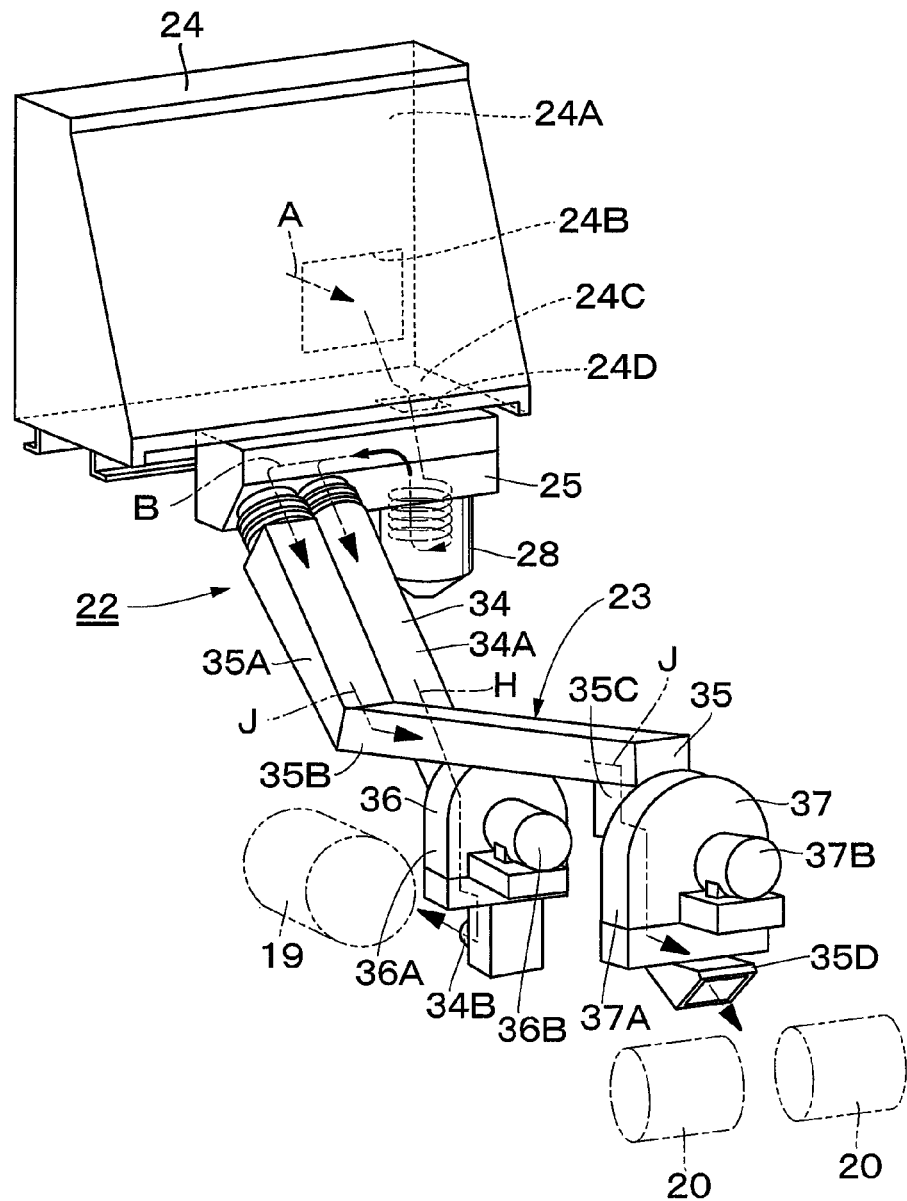
FIG. 7 is a perspective view showing the cooling air supply device in FIG. 6 as viewed from a left oblique backside.

Here, in the present embodiment, the control cabinet 24 serves to accommodate the inverter, the control board and the like, and, besides, forms a part of the cooling air supply line 23 in the cooling air supply device 22. Therefore, as shown in FIG. 3, the cooling air inlet port 24B taking in outside air as cooling air is provided on a front surface 24A of the control cabinet 24 to open therein. As shown in FIG. 7, a cooling air outlet port 24D (which is an outlet port of the cooling air) from which the cooling air taken in the control cabinet 24 flows out is provided on a bottom portion 24C of the control cabinet 24 to open therein. The cooling air outlet port 24D is connected to an inlet port 25G of the assembly box 25 to be described later.

Thereby, as shown in an arrow A in FIG. 3 to FIG. 7, the cooling air taken in from the cooling air inlet port 24B of the control cabinet 24 passes through the periphery of the radiator for the inverter and the like accommodated in the control cabinet 24, and flows through the cooling air outlet port 24D into the assembly box 25. At this time, the cooling air can cool the radiator for the inverter.

Designated at 25 is the assembly box (plenum box) that is mounted to a lower side of the control cabinet 24 by using a fixing tool (not shown) such as bolts, and the assembly box 25 is connected to the cooling air outlet port 24D of the control cabinet 24. As shown in an arrow B in FIG. 4 and FIG. 7, the cooling air that has passed through the control cabinet 24 flows into the assembly box 25, which causes the cooling air to be branched to the alternator side duct 34 and the electric motor side duct 35, which will be described later.

Figure 8:
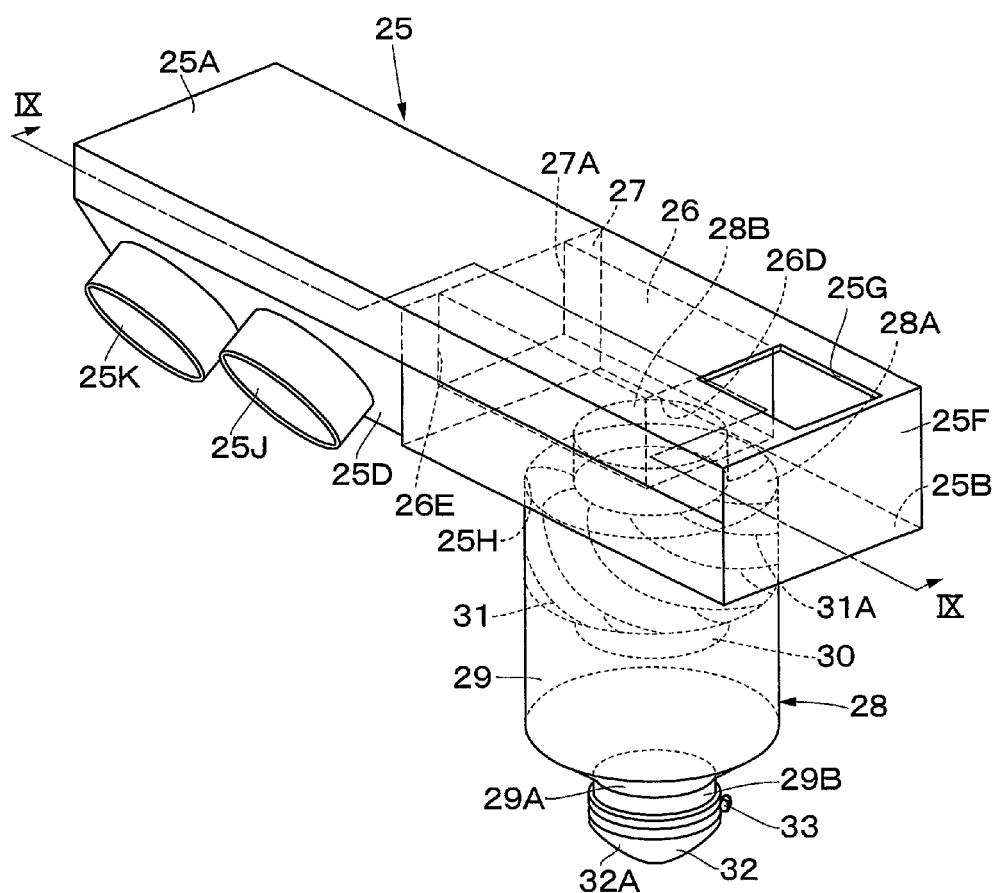
FIG. 8 is a perspective view showing a assembly box and a dust separator as viewed from an oblique backside.
Figure 9:
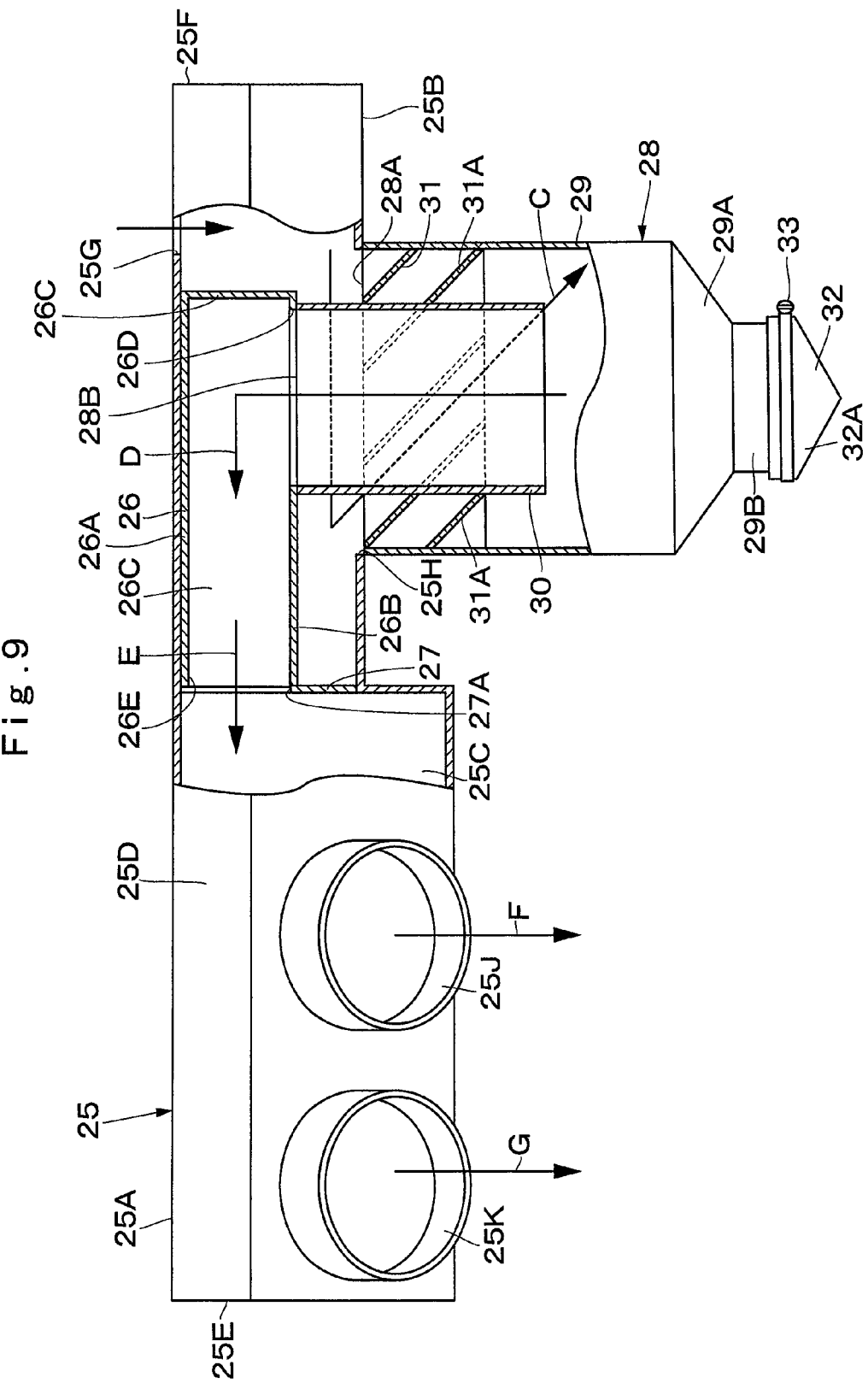
FIG. 9 is a partial cutaway outside appearance view showing the assembly box and the dust separator as viewed in the direction of arrows IX-IX in FIG. 8.
Figure 10:
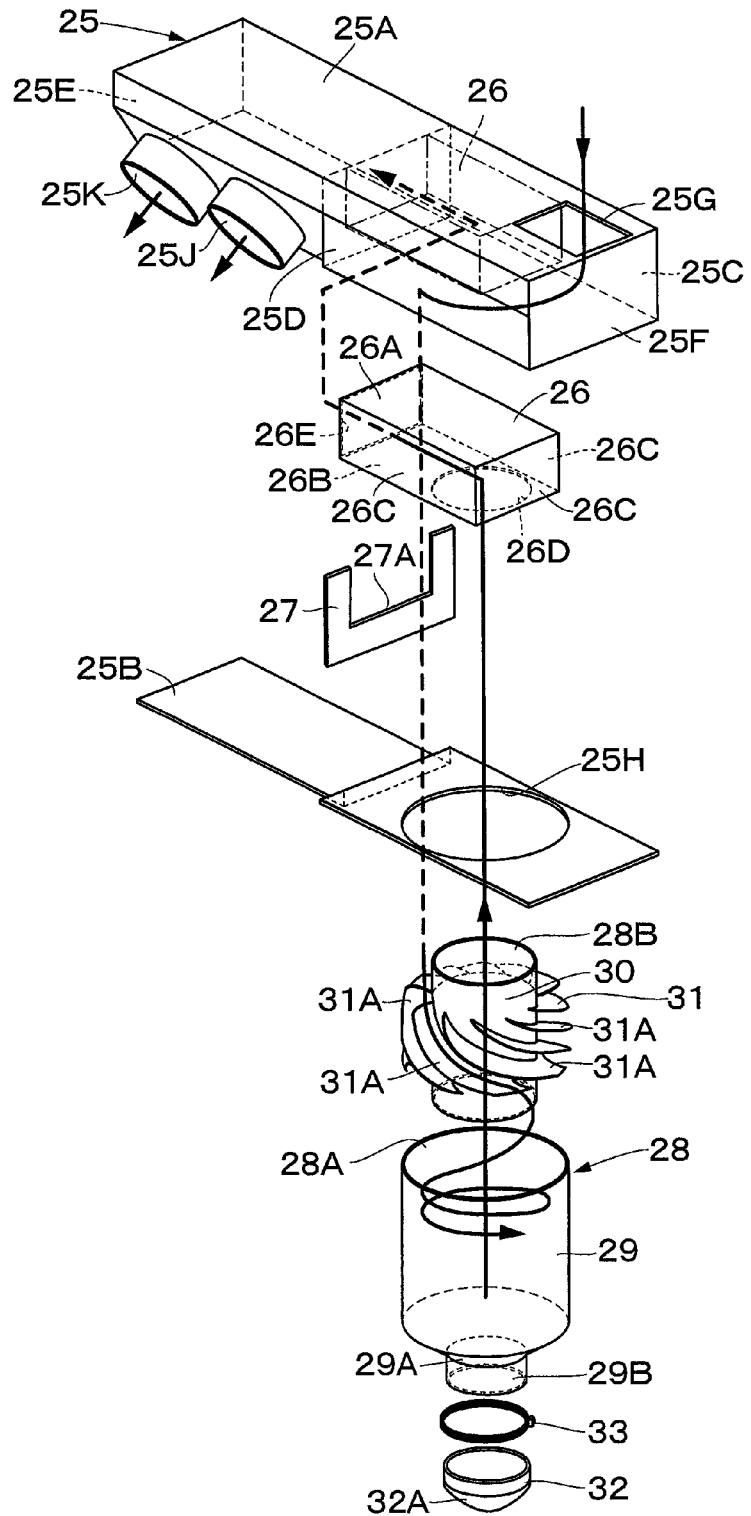
FIG. 10 is an exploded perspective view showing the assembly box and the dust separator.

Here, as shown in FIG. 8 to FIG. 10, the assembly box 25 is formed as a substantially rectangular parallelepiped-shaped, hollow boxy body comprising an upper plate portion 25A, a bottom plate portion 25B, a front plate portion 25C, a rear plate portion 25D, a left side plate portion 25E, and a right side plate portion 25F. The assembly box 25 is provided with a dust separator side joint port 25H, an alternator side joint port 25J and an electric motor side joint port 25K, which will be described later, and a joint box 26 and a partition plate 27, which will be described later, are provided in the assembly box 25. Further, a dust separator 28 to be described later is provided to be connected to a lower end side of the assembly box 25.

The inlet port 25G connected to the cooling air outlet port 24D of the control cabinet 24 is provided in one end side (right end side) of the upper plate portion 25A of the assembly box 25 in the left-right direction. On the other hand, the dust separator side joint port 25H to which a separator inlet port 28A of the dust separator 28 to be described later is jointed is provided in one end side (right end side) of the bottom plate portion 25B of the assembly box 25 in the left-right direction.

The alternator side joint port 25J communicated with the alternator 19 and the electric motor side joint port 25K communicated with the electric motor 20 are provided in the other end side (left end side) of the rear plate portion 25D of the assembly box 25 in the left-right direction to be adjacent to each other in the left-right direction. An upstream end of the alternator side duct 34 to be described later is jointed to the alternator side joint port 25J, and an upstream end of the electric motor side duct 35 to be described later is jointed to the electric motor side joint port 25K. The alternator side joint port 25J and the electric motor side joint port 25K are positioned downstream of the dust separator side joint port 25H in the flowing direction of cooling air.

That is, the alternator side joint port 25J and the electric motor side joint port 25K are provided in the downstream side at the opposite side to the inlet port 25G around the partition plate 27 in the assembly box 25 (to the left from the partition plate 27). On the other hand, the dust separator side joint port 25H is provided in the upstream side at the opposite side to the alternator side joint port 25J and the electric motor side joint port 25K around the partition plate 27 in the assembly box 25 (to the right from the partition plate 27). Therefore, the dust separator side joint port 25H is positioned upstream of the alternator side joint port 25J and the electric motor side joint port 25K in the flowing direction of cooling air.

Indicated at 26 is the joint box that is provided in the assembly box 25, and the joint box 26 joints a separator outlet port 28B of the dust separator 28 to be described later to the alternator side joint port 25J and the electric motor side joint port 25K in the assembly box 25. Here, the joint box 26 comprises an upper plate 26A, a bottom plate 26B and three sheets of side plates 26C surrounding three sides (front, rear and right sides) together with the upper plate 26A and the bottom plate 26B. Accordingly, the joint box 26 is formed as a rectangular parallelepiped-shaped, hollow boxy body extending in the left-right direction.

As shown in FIG. 9, an inlet side opening 26D is provided in the bottom plate 26B of the joint box 26, and the inlet side opening 26D is connected to the separator outlet port 28B of the dust separator 28 to be described later. On the other hand, a left surface of the joint box 26 forms part of an outlet side opening 26E, and the outlet side opening 26E is connected to a notched portion 27A of the partition plate 27 to be described later. Thereby, the cooling air that has passed through the dust separator 28 and has flown into the joint box 26 from the inlet side opening 26D flows out through the outlet side opening 26E of the joint box 26 to the alternator side joint port 25J and the electric motor side joint port 25K.

Indicated at 27 is the partition plate as a partition member that is provided in the assembly box 25. The partition plate 27 is positioned in a central part in the assembly box 25 in the left-right direction, and partitions an inside of the assembly box 25 to the left and right. Specifically, the partition plate 27 blocks the cooling air having flown from the inlet port 25G from directly flowing into the alternator side joint port 25J and the electric motor side joint port 25K without via the joint box 26.

Here, as shown in FIG. 10, the partition plate 27 is formed as a substantially U-letter shaped plate body having the notched portion 27A, and the notched portion 27A of the partition plate 27 is jointed to the outlet side opening 26E of the joint box 26. Therefore, the partition plate 27 blocks the cooling air having flown into the assembly box 25 from the inlet port 25G of the assembly box 25 (cooling air before passing through the dust separator 28) from directly flowing into the side of the alternator side joint port 25J and the electric motor side joint port 25K (without via the dust separator 28). On the other hand, the cooling air that has passed through the dust separator 28 and has flown into the joint box 26 flows out from the inlet side opening 26D through the outlet side opening 26E of the joint box 26 to the alternator side joint port 25J and the electric motor side joint port 25K.

Next, an explanation will be made of the dust separator 28 that is provided in the assembly box 25.

Designated at 28 is the dust separator that is provided in the halfway section of the cooling air supply line 23. Specifically, the dust separator 28 is the halfway section of the cooling air supply line 23 and is positioned upstream of the cooling fans 36 and 37 to be described later in the flowing direction of the cooling air to be provided in the assembly box 25. The dust separator 28 causes the cooling air having flown from the separator inlet port 28A to circulate spirally (revolve), thereby allowing dust such as fine sand or powder dust mixed in the cooling air to be centrifugally separated from the cooling air and the purified cooling air to flow out of the separator outlet port 28B. Here, as shown in FIG. 8 to FIG. 10, the dust separator 28 is configured schematically by an outer tube 29, an inner tube 30, a spiral passage body 31 and a dust receiver 32.

Indicated at 29 is the outer tube forming an outer shell of the dust separator 28. The outer tube 29 is positioned in a lower side of the bottom plate portion 25B of the assembly box 25 and is arranged to extend in an upper-lower direction. An upper end side of the outer tube 29 forms part of the separator inlet port 28A of the dust separator 28 and is jointed to the dust separator side joint port 25H of the bottom plate portion 25B. The outer tube 29 has a lower side provided with an inclined portion 29A inclined in such a direction that an inner diameter thereof is smaller toward the lower side and a small diameter portion 29B an inner diameter of which is smaller as compared to that of an upper side of the outer tube 29. A lower side of the small diameter portion 29B is provided with a dust receiver 32, which will be described later, and the dust receiver 32 is removably mounted thereon by a band 33.

Indicated at 30 is the inner tube that is positioned inside the outer tube 29 and is arranged to extend in an upper-lower direction. The inner tube 30 is formed to be smaller in diameter than the outer tube 29. The inner tube 30 defines a space between the outer tube 29 and the inner tube 30, and introduces the cooling air purified by the spiral passage body 31 to be described later into the joint box 26. Therefore, an upper end side of the inner tube 30 forms part of the separator outlet port 28B of the dust separator 28 and is jointed to the inlet side opening 26D of the joint box 26. On the other hand, a lower end side of the inner tube 30 extends closer to the lower side in the outer tube 29 than the spiral passage body 31. Thereby, as shown in an arrow C and an arrow D in FIG. 9, the cooling air that has passed through the spiral passage body 31 and has flown into a lower side space in the outer tube 29 can be circulated through the inside of the inner tube 30 into the joint box 26.

Indicated at 31 is the spiral passage body that is arranged between the outer tube 29 and the inner tube 30. The spiral passage body 31 separates the dust while spirally circulating the cooling air between an inner peripheral surface of the outer tube 29 and an outer peripheral surface of the inner tube 30. The spiral passage body 31 comprises a plurality of inclined plates 31A that are provided between the outer tube 29 and the inner tube 30 and are inclined from an upper side to a lower side. Thereby, as shown in an arrow C in FIG. 9, the cooling air that has flown through the inlet port 25G into the assembly box 25 flows through the separator inlet port 28A jointed to the dust separator side joint port 25H into the dust separator 28. This cooling air spirally circulates between the outer tube 29 and the inner tube 30 along each inclined plate 31A from the upper side to the lower side (flows swirly).

At this time, the dust in the cooling air revolving along each inclined plate 31A is pushed out in a radial outside based upon a centrifugal force to drop to a lower side along the inner peripheral surface of the outer tube 29 and the inclined plate 31A, and is reserved in the dust receiver 32 to be described later. Therefore, the dust can be separated (removed) from the cooling air, and the dust separated from the cooling air can be received by the dust receiver 32.

The cooling air the dust of which is removed by the spiral passage body 31 flows out from the separator outlet port 28B (inner tube 30) of the dust separator 28 into the joint box 26, and is introduced to the alternator side joint port 25J and the electric motor side joint port 25K of the assembly box 25. Thereby, the purified cooling air is supplied through the alternator side duct 34 to be described later to the alternator 19, and is supplied through the electric motor side duct 35 to each electric motor 20, thus making it possible to cool the alternator 19 and the electric motor 20. In this case, since it is possible to suppress the dust from adhering to the alternator 19 and the electric motor 20, durability of the alternator 19 or the electric motor 20 can be secured. In addition, since it is possible to remove the dust from the cooling air without using the filter having a possibility of being clogged, the dust can be removed from the cooling air, and a sufficient cooling air amount can be kept.

Indicated at 32 is the dust receiver that is provided in a low end side (small diameter portion 29B) of the outer tube 29, and the dust receiver 32 reserves therein dust separated from the cooling air by the spiral passage body 31. Here, the dust receiver 32 is formed as a bottomed cylindrical body, having a bottom portion 32A that substantially conically projects downward, and is removably mounted to the small diameter portion 29B by using the band 33. Accordingly, the dust reserved in the dust receiver 32 can be disposed by removing the dust receiver 32 together with the band 33 from the outer tube 29 (small diameter portion 29B). In this case, since jobs such as preparation and replacement of a new filter as in the case of using the filter are not necessary, the maintenance of the dust separator 28 including disposal of the dust can easily be performed.

Next, indicated at 34 is the alternator side duct that establishes connection between the alternator side joint port 25J of the assembly box 25 and the alternator 19. The alternator side duct 34 is formed as a tubular body in which cooling air flows, and is disposed between the assembly box 25 and the alternator 19. Here, the alternator side duct 34 comprises an upstream duct 34A, and a downstream duct 34B. The upstream duct 34A obliquely extends to a backward lower side to be directed between the left and right leg parts 6C and 6D forming part of the base frame 6 of the vehicle body 2 from the assembly box 25 and is connected to the alternator side cooling fan 36 to be described later. On the other hand, the downstream duct 34B establishes connection between the alternator side cooling fan 36 and the alternator 19.

Indicated at 35 is the electric motor side duct that establishes connection between the electric motor side joint port 25K of the assembly box 25 and the electric motor 20. The electric motor side duct 35 is formed as a tubular body in which cooling air flows, and is disposed between the assembly box 25 and the axle housing 12 in which the electric motor 20 is accommodated. Here, the electric motor side duct 35 comprises a first upstream duct 35A, a second upstream duct 35B, a third upstream duct 35C, and a downstream duct 35D. The first upstream duct 35A obliquely extends to a backward lower side to be directed between the left and right leg parts 6C and 6D forming part of the base frame 6 of the vehicle body 2 from the assembly box 25. The second upstream duct 35B is connected to a downstream end of the first upstream duct 35A and extends along an upper surface of the base frame 6. The third upstream duct 35C enters into an opening portion 6A of the base frame 6 from a downstream end of the second upstream duct 35B, and is connected to an electric motor side cooling fan 37 to be described later. The downstream duct 35D establishes connection between the electric motor side cooling fan 37 and the axle housing 12.

Next, indicated at 36 is the alternator side cooling fan that is provided downstream of the assembly box 25 and the dust separator 28. That is, the alternator side cooling fan 36 is positioned in rear of the alternator 19 and is provided between the left and right leg parts 6C and 6D forming part of the base frame 6. The alternator side cooling fan 36 sucks outside air as cooling air from the cooling air inlet port 24B of the control cabinet 24 into the alternator side duct 34 and supplies (blows in) the cooling air toward the alternator 19. Here, the alternator side cooling fan 36 is formed as a suction type of cooling fan (blower), and is provided in the halfway section of the alternator side duct 34, that is, between the upstream duct 34A and the downstream duct 34B.

Here, the alternator side cooling fan 36 schematically comprises a casing 36A that is formed as an outer shell and to which the upstream duct 34A and the downstream duct 34B are connected, an electric motor 36B that is provided in the casing 36A, and a blade (not shown) that is rotated by the electric motor 36B. The alternator side cooling fan 36 drives and rotates the blade by the electric motor 36B to cause stream of air (cooling air) moving toward the alternator 19 from the cooling air inlet port 24B through the control cabinet 24, the assembly box 25, the dust separator 28, and the alternator side duct 34.

Indicated at 37 is the electric motor side cooling fan that is provided downstream of the assembly box 25 and the duct separator 28. That is, the electric motor side cooling fan 37 is positioned in front of and above the axle housing 12 and is provided in the opening portion 6A of the base frame 6. The electric motor side cooling fan 37 sucks outside air as cooling air into the electric motor side duct 35 from the cooling air inlet port 24B of the control cabinet 24, and supplies (blows) the cooling air toward the electric motor 20. Here, the electric motor side cooling fan 37 is formed as a suction type of cooling fan (blower), and is provided in the halfway section of the electric motor side duct 35, that is, between the third upstream duct 35C and the downstream duct 35D.

Here, the electric motor side cooling fan 37 schematically comprises a casing 37A that is formed as an outer shell, an electric motor 37B that is provided in the casing 37A, and a blade (not shown) that is rotated by the electric motor 37B. The third upstream duct 35C and the downstream duct 35D are connected to the casing 37A of the electric motor side cooling fan 37. The electric motor side cooling fan 37 drives and rotates the blade by the electric motor 37B to cause stream of air (cooling air) moving toward the electric motor 20 in the axle housing 12 from the cooling air inlet port 24B through the control cabinet 24, the assembly box 25, the dust separator 28, and the electric motor side duct 35.

Next, an explanation will be made of flow of cooling air that is supplied to the alternator 19 and the electric motor 20 for traveling by the cooling air supply device 22.

At the driving of the dump truck 1, the alternator side cooling fan 36 and the electric motor side cooling fan 37 of the cooling air supply device 22 are driven. Thereby, as shown in an arrow A in FIG. 3 to FIG. 7, outside air is sucked in the control cabinet 24 as cooling air through the cooling air inlet port 24B. The cooling air having been sucked in the control cabinet 24 passes through the periphery of the control board, the radiator for the inverter and the like accommodated in the control cabinet 24, and flows out from the cooling air outlet port 24D of the control cabinet 24 after cooling the control board and the radiator.

The cooling air having flown out from the control cabinet 24 flows into the assembly box 25 through the inlet port 25G of the assembly box 25. As shown in an arrow C in FIG. 9, the cooling air having flown into the assembly box 25 flows from the separator inlet port 28A (outer tube 29) jointed to the dust separator side joint port 25H of the assembly box 25 into the dust separator 28. The cooling air spirally circulates (revolves and flows) along each inclined plate 31A of the spiral passage body 31 in the dust separator 28 from upper side to lower side.

At this time, the dust in the revolving cooling air is pushed in a radial outside based upon a centrifugal force to be separated from the cooling air and drop down to the dust receiver 32. On the other hand, as shown in an arrow D in FIG. 9, the cooling air from which the dust is removed, flows inside the inner tube 30 of the dust separator 28 from lower side to upper side, and flows into the joint box 26 through the separator outlet port 28B jointed to the inlet side opening 26D of the joint box 26.

As shown in an arrow E in FIG. 9, the cooling air having flown into the joint box 26 flows through the outlet side opening 26E of the joint box 26 to the downstream side (left side) in the assembly box 25. As shown in an arrow F and an arrow G in FIG. 9, this cooling air is branched into cooling air flowing from the alternator side joint port 25J to the alternator 19, and cooling air flowing from the electric motor side joint port 25K to the electric motor 20.

As shown in an arrow H in FIG. 4 to FIG. 7, the cooling air flowing from the alternator side joint port 25J to the alternator 19 is supplied to the alternator 19 through the upstream duct 34A of the alternator side duct 34, the casing 36A of the alternator side cooling fan 36, and the downstream duct 34B. Thereby, the alternator 19 can be cooled by the purified cooling air from which the dust is removed. At this time, since the cooling air for cooling the alternator 19 is in a state where the dust is removed therefrom because of the passing through the dust separator 28, it is possible to suppress the dust from adhering to the alternator 19 to enhance durability of the alternator 19.

On the other hand, as shown in an arrow J in FIG. 4 to FIG. 7, the cooling air flowing from the electric motor side joint port 25K to the electric motor 20 is supplied into the axle housing 12 through the first, second and third upstream ducts 35A, 35B, and 35C of the electric motor side duct 35, the casing 37A of the electric motor side cooling fan 37, and the downstream duct 35D. Thereby, the electric motor 20 for travelling accommodated in the axle housing 12 can be cooled by the purified cooling air from which the dust is removed. At this time, since the cooling air for cooling the electric motor 20 is in a state where the dust is removed therefrom because of the passing through the dust separator 28, it is possible to suppress the dust from adhering to each electric motor 20 to enhance durability of the electric motor 20.

It should be noted that the dust reserved in the dust receiver 32 of the dust separator 28 can be disposed by removing the dust receiver 32 from the outer tube 29 as needed. At this time, as compared to a case of trapping dust by using a filter, since jobs such as preparation, replacement and the like of a new filter are not necessary, maintenance of the dust separator 28 including disposal of dust can easily be performed.

The dump truck 1 according to the present embodiment has the aforementioned configuration, and next, an operation thereof will be explained.

First, in a crushed stone site of amine or the like, crushed stones as transport objects are loaded on the loading platform 3 in the dump truck 1 by using a large-sized hydraulic excavator (not shown). Next, the dump truck 1 transports a large volume of crushed stones in a state of being loaded on the loading platform 3 toward an unloading site.

When the dump truck 1 arrives at the unloading site, an operator in the cab 17 manually performs a tilting operation of an operating level. Thereby, the hoist cylinder 8 extends with supply of pressurized oil to lift the loading platform 3 in such a manner as to be inclined obliquely backward. In consequence, the loading platform 3 in the dump truck 1 rotates upward on a basis of the connecting pin 4, and the crushed stores in the loading platform 3 are discharged toward a collection point in such a manner as to slide downward.

When the discharge work of the crushed stores is completed, the operator manually performs the tilting operation of the operating lever to be able to discharge oil liquids in the hoist cylinder 8. Thereby, the hoist cylinder 8 contracts according to self-weight of the loading platform 3, and the loading platform 3 moves down to the transport position shown in FIG. 1 and is seated on the vehicle body 2.

At this working time (driving time) of the dump truck 1, the alternator 19 and the electric motor 20 for traveling are cooled by the cooling air supplied by the cooling air supply device 22. In this case, according to the present embodiment, the dust separator 28 is provided in the halfway section in the cooling air supply line 23 to centrifugally separate the dust in the cooling air. In consequence, both removing the dust from the cooling air and keeping a sufficient cooling air amount can be performed.

That is, since the dust can be removed from the cooling air by the dust separator 28, it is possible to suppress for the dust to adhere to the alternator 19 and the electric motor 20 for traveling as cooling targets to ensure durability of the alternator 19 and the electric motor 20. Further, since it is not necessary to use the filter having a possibility of being clogged, the cooling air amount does not reduce with an elapse of driving hours. Therefore, a sufficient cooling air amount for cooling the alternator 19 and the electric motor 20 can be kept to stably cool them for a long period of time. As a result, durability and stability of the dump truck 1 can be improved.

Further, according to the present embodiment, since the dust separator 28 is connected to the assembly box 25 connected to the cooling air outlet port 24D of the control cabinet 24, the assembly box 25 and the dust separator 28 can be arranged together to be adjacent to the control cabinet 24. In this case, the dust separator 28 can be provided (connected) to the existing assembly box 25 without necessity of the large design change. In addition, the dust separator side joint port 25H is positioned upstream of the alternator side joint port 25J and the electric motor side joint port 25K in the flowing direction of cooling air. Thereby, the dust in the cooling air which will be supplied to the alternator 19 and the electric motor 20 can be removed by the single dust separator 28. As a result, it is not necessary to mount the dust separator to each of the alternator 19 and the electric motor 20, and the dust can be removed by the single dust separator 28. In addition, by using the single dust separator 28, the cooling air supply device 22 can be constructed in a compact manner.

Furthermore, according to the present embodiment, the cooling air passes through the spiral passage body 31 arranged between the outer tube 29 and the inner tube 30 of the dust separator 28, thereby making it possible to separate the dust from the cooling air for removal. The cooling air from which the dust is separated is sent through the inside of the inner tube 30 to the alternator 19 and the electric motor 20, and the dust separated from the cooling air is reserved in the dust receiver 32 removably mounted in the lower end side of the outer tube 29. Accordingly, even when the dust reserved in the dust receiver 32 increases with an elapse of an operating time, the reserved dust can easily be disposed by removing the dust receiver 32 from the outer tube 29. Therefore, as compared to a case of trapping the dust by using the filter, since jobs such as preparation, replacement and the like of a new filter are not necessary, maintenance of the dust separator 28 including disposal of dust can easily be performed.

It should be noted that the aforementioned embodiment is explained by taking a case where the cooling air inlet port 24B for taking in outside air opens to the control cabinet 24 as an example. However, the present invention is not limited thereto, and the present invention may be applied to the configuration where the control cabinet 24 and the assembly box 25 are respectively installed in different locations. In this case, since the assembly box 25 is positioned in the most upstream end of the cooling air supply line 23, a cooling air inlet port for taking in outside air is provided in the assembly box 25, that is, the inlet port 25G of the assembly box 25 forms part of the cooling air inlet port. Therefore, the cooling air inlet port of the cooling air supply line 23 may be provided in any of the control cabinet 24 and the assembly box 25.

The aforementioned embodiment is explained by taking a case where the dust separator 28 is provided in the assembly box 25 that is the halfway section of the cooling air supply line 23 as an example. However, the present invention is not limited thereto, and the present invention may be applied to, for example, the configuration that the dust separator 28 is provided in the control cabinet 24 forming the cooling air supply line 23, or in the halfway section of the alternator side duct 34 or the electric motor side duct 35.

Further, the aforementioned embodiment is explained by taking a case where the cooling air is spirally circulated (revolved) by the spiral passage body 31 forming the dust separator 28 as an example. However, the present invention is not limited thereto, and the present invention may be applied to, for example, the configuration that the dust separator comprises a single cylindrical body and the cooling air is revolved (is spirally circulated) in the cylindrical body. That is, various kinds of centrifugal separation type of dust separators may be adopted as long as the dust separator can revolve the cooling air.

DESCRIPTION OF REFERENCE NUMERALS

1: Dump truck (Transporter vehicle)
2: Vehicle body
3: Loading platform
18: Engine
19: Alternator
20: Electric motor
22: Cooling air supply device
23: Cooling air supply line
24: Control cabinet
24B: Cooling air inlet port
24D: Cooling air outlet port
25: Assembly box
25H: Dust separator side joint port
25J: Alternator side joint port
25K: Electric motor side joint port
26: Joint box
27: Partition plate (Partition member)
28: Dust separator
28A: Separator inlet port
28B: Separator outlet port
29: Outer tube
30: Inner tube
31: Spiral passage body
32: Dust receiver
34: Alternator side duct
35: Electric motor side duct
36: Alternator side cooling fan
37: Electric motor side cooling fan

The invention claimed is:

1. A transporter vehicle comprising:
a vehicle body (2) on which a loading platform (3) for loading objects to be transported is provided;
an engine (18) that is mounted on said vehicle body (2);
an alternator (19) that is driven by said engine (18) to perform power generation;
an electric motor (20) for traveling to which drive power is supplied based upon the power generation of said alternator (19); and
a cooling air supply device (22) for supplying cooling air to said alternator (19) and said electric motor (20) that are cooling targets, wherein
said cooling air supply device (22) comprising:
a cooling air inlet port (24B, 25G) for taking in outside air as cooling air;
a cooling air supply line (23) for establishing connection between said cooling air inlet port (24B, 25G) and said cooling targets; and
a cooling fan (36, 37) for sucking the cooling air from said cooling air inlet port (24B, 25G) into said cooling air supply line (23), characterized in that:
a dust separator (28) is provided in the halfway section of said cooling air supply line (23) to be positioned upstream of said cooling fan (36, 37) and spirally circulate the cooling air, thereby, centrifugally separating the dust from said cooling air, wherein
said cooling air supply line (23) is provided with an assembly box (25) including an inlet port into (25G) which the cooling air flows, a dust separator side joint port (25H) to which said dust separator (28) is jointed, an alternator side joint port (25J) communicated with said alternator (19), and an electric motor side joint port (25K) communicated with said electric motor (20),
said dust separator (28) includes a separator inlet port (28A) into which cooling air containing dust flows and a separator outlet port (28B) from which the cooling air from which the dust is separated flows out,
said separator inlet port (28A) is jointed to said dust separator side joint port (25H) of said assembly box (25),
said separator outlet port (28B) is communicated with said alternator side joint port (25J) and said electric motor side joint port (25K) of said assembly box (25), and
said cooling air purified by said dust separator (28) is supplied to said alternator (19) and said electric motor (20) by said cooling fan (36, 37).

2. The transporter vehicle according to claim 1, wherein said assembly box (25) is provided therein with a joint box (26) for jointing said separator outlet port (28B) of said dust separator (28) to said alternator side joint port (25J) and said electric motor side joint port (25K), and
a partition member (27) for blocking off the cooling air flowing in from said inlet port (25G) to directly flowing into said alternator side joint port (25J) and said electric motor side joint port (25K) not through said joint box (26).

3. The transporter vehicle according to claim 1, wherein
a control cabinet (24) in which a control board for controlling electrical equipment is accommodated is jointed to said inlet port (25G) of said assembly box (25), and
said control cabinet (24) is provided with said cooling air inlet port (24B).

4. The transporter vehicle according to claim 1, wherein
said inlet port (25G) of said assembly box (25) is used as said cooling air inlet port.

5. The transporter vehicle according to claim 1, wherein
said cooling air supply line (23) includes a control cabinet (24) to which said cooling air inlet port (24B) opens and a cooling air outlet port (24D) to which an inlet port (25G) of said assembly box (25) is connected opens,
said alternator side joint port (25J) of said assembly box (25) and said alternator (19) are jointed by an alternator side duct (34) including an alternator side cooling fan (36),
said electric motor side joint port (25K) of said assembly box (25) and said electric motor (20) are jointed by an electric motor side duct (35) including an electric motor side cooling fan (37), and
said dust separator side joint port (25H) of said assembly box (25) is positioned upstream of said alternator side joint port (25J) and said electric motor side joint port (25K) in a flowing direction of cooling air.

6. The transporter vehicle according to claim 1, wherein
said dust separator (28) comprises:
a cylindrical outer tube (29) that is arranged to extend in an upper-lower direction and into which cooling air flows from said cooling air inlet port (24B, 25G);
an inner tube (30) that is positioned inside said outer tube (29) and is arranged to extend in the upper-lower direction, and from which the purified cooling air flows out;
a spiral passage body (31) that is positioned between said outer tube (29) and said inner tube (30) and separates the dust while the cooling air spirally circulates therein; and
a dust receiver (32) that is removably mounted to said outer tube (29) in a lower end of said outer tube (29) to reserve the dust separated from the cooling air by said spiral passage body (31).

\* \* \* \* \*